United States Patent [19]

Niederer

[11] Patent Number: 4,948,324

[45] Date of Patent: Aug. 14, 1990

[54] CONTAINER EMPTYING APPARATUS, ASSEMBLY AND METHOD

[75] Inventor: Kurt W. Niederer, Charlotte, N.C.

[73] Assignee: Toter, Inc., Statesville, N.C.

[21] Appl. No.: 366,789

[22] Filed: Jun. 14, 1989

[51] Int. Cl.[5] .............................. B60P 1/16; B65F 3/04
[52] U.S. Cl. ................................. 414/415; 414/363;
414/365; 414/420; 414/421; 298/17.5
[58] Field of Search ............... 414/354, 355, 359, 360,
414/361, 362, 363, 365, 367, 368, 373, 375, 385,
403, 404, 415, 419, 420, 421, 425, 572, 575, 576,
577, 580, 582, 583, 584; 298/17.5

[56] References Cited

U.S. PATENT DOCUMENTS

| | | |
|---|---|---|
| 1,520,295 | 12/1924 | McCullough et al. |
| 2,260,697 | 10/1941 | Allen. |
| 3,486,649 | 12/1969 | Schaller .............................. 414/421 |
| 3,513,944 | 5/1970 | McConnaughhay ............ 414/362 X |
| 3,576,265 | 4/1971 | Brady et al. ..................... 414/408 X |
| 3,610,690 | 10/1971 | Mengel ................................ 298/17.5 |
| 3,633,971 | 1/1972 | Berky et al. ..................... 298/17.5 X |
| 3,844,615 | 10/1974 | Anderson ......................... 414/421 X |
| 3,937,502 | 2/1976 | Gay .................................... 414/420 X |
| 4,215,968 | 8/1980 | Rymer .................................. 414/421 |
| 4,285,624 | 8/1981 | Propst et al. ......................... 414/362 |
| 4,289,353 | 9/1981 | Merritt ............................... 298/17.5 |
| 4,363,588 | 12/1982 | Stickney .............................. 414/408 |

FOREIGN PATENT DOCUMENTS

| | | | |
|---|---|---|---|
| 1038481 | 3/1957 | Fed. Rep. of Germany ...... 414/421 |
| 2504077 | 8/1976 | Fed. Rep. of Germany ...... 414/406 |
| 2909438 | 9/1979 | Fed. Rep. of Germany ...... 414/406 |
| 1579930 | 8/1969 | France .................................. 414/421 |
| 54-129660 | 10/1979 | Japan ................................... 414/403 |
| 1242437 | 7/1986 | U.S.S.R. .............................. 414/421 |

OTHER PUBLICATIONS

SP Industries brochure.
Marathon Equipment Company, Inc. brochure, 1982.
Toter Systems brochure, 1985.
Rubbermaid Applied Products, Inc.

*Primary Examiner*—David A. Bucci
*Assistant Examiner*—Robert S. Katz
*Attorney, Agent, or Firm*—W. Thad Adams, III

[57] ABSTRACT

An apparatus for lifting and tipping a container off of a supporting surface in order to dump contents therefrom, the container being of the type having a bottom wall and upright side walls, the upper extent of which side walls define an opening. The apparatus includes a hook for engaging the bottom of the container and a first support carrying the hook for supporting the bottom of the container through a range of lifting and tipping movement upwardly from the supporting surface and defining a first movement segment wherein the forward side wall of the container in relation to the direction of movement of the container is unsupported. A second support cooperates with the first support for supporting the forward side wall of the container through a second range of lifting and tipping movement subsequent to the first lifting and tipping movement wherein the container is tipped to an angle sufficient to empty the contents therefrom. Alternately, the second support cooperates with the first support through a second range of lifting and tipping movement but does not actually support the forward wall of the container. An actuator is operatively connected to the first and second support for powering the first and second movement segments.

26 Claims, 10 Drawing Sheets

FIG. I

CONTAINER EMPTYING APPARATUS, ASSEMBLY AND METHOD

TECHNICAL FIELD AND BACKGROUND OF THE INVENTION

This invention relates to a container emptying apparatus and method. The apparatus and method has particular application for a dock level dumper of the type which, for example, may be used to empty rather large wheel-mounted containers into a trash compactor or a trailer parked adjacent the dock. A typical construction for such a container is a plastic body having a bottom and four side walls. One of the walls comprises a front wall which is angled forward to assist in emptying. The container is mounted on a pair of relatively large wheels positioned near the front of the bottom and a relatively small pair of caster wheels mounted near the rear of the bottom.

Since such containers are relatively deep, the container must be nearly inverted in order to insure that the contents are completely emptied. In addition, it is helpful if the container can be gently jarred near the end of the emptying movement to shake loose the contents and further insure complete emptying.

Prior art emptying devices typically grip the container at or near its front wall while supporting the front wall. The container is then lifted and tipped while supporting the front wall of the container. See, for example, U.S. Pat. No. 4,285,624 (FIG. 8). This type of emptying motion requires that the container be lifted quite high off of the floor and swung through a wide and high arc around a single pivot. This motion is quite inefficient and places stress on the container since the container is pivoted around the same point even as the center of gravity of the container changes. In addition, the emptying takes place when the container is high above the receptacle, increasing the force with which the contents are emptied and increasing the possibility that the contents of the container will miss the receptacle altogether.

For safety reasons, it would also be desirable to provide a positive means for insuring that the container is properly mounted on the emptying apparatus before lifting begins.

The invention described below provides a compact, efficient and safe emptying apparatus which nevertheless provides complete emptying with minimum wear and tear on the container. In addition, safety features prevent premature lifting or lifting when the cart is not properly mounted on the lifter.

SUMMARY OF THE INVENTION

Therefore, it is an object of the invention to provide a container lifting and emptying apparatus which is compact and efficient.

It is another object of the invention to provide a container lifting and emptying apparatus which lifts the container through a motion which enhances complete emptying of the container while at a position relatively close to contents receptacle.

It is another object of the invention to provide a container lifting and emptying apparatus which lifts the container only if it is properly mounted on the lifter.

It is another object of the invention to provide a container lifting and emptying apparatus with which the container is gently jarred near the end of the emptying movement to shake loose the contents and further insure complete emptying.

These and other objects of the present invention are achieved in the preferred embodiments disclosed below by providing an apparatus for lifting and tipping a container off of a supporting surface such as a loading dock in order to dump contents therefrom, the container being of the type having a bottom wall and upright side walls, the upper extent of which side walls define an opening. The apparatus includes engagement means for engaging the bottom of the container and first support means carrying the engagement means for supporting the bottom of the container through a range of lifting and tipping movement upwardly from the supporting surface and defining a first movement segment wherein the forward side wall of the container in relation to the direction of movement of the container is unsupported. Second support means cooperate with the first support means for supporting the forward side wall of the container through a second range of lifting and tipping movement subsequent to the first lifting and tipping movement wherein the container is tipped to an angle sufficient to empty the contents therefrom.

Actuator means are operatively connected to the first and second support means for powering the first and second movement segments.

According to one preferred embodiment of the invention, the first movement segment includes movement of the forward wall of the container into contact with the second support means with sufficient force to assist in dislodging the contents of the container therefrom.

According to another preferred embodiment of the invention, the container includes connection means attached to the bottom thereof and cooperating with the engagement means.

According to yet another preferred embodiment of the invention, the connection means includes switch means cooperating with the engagement means for activating the actuator means when the container is properly oriented in relation to the apparatus.

Preferably, the engagement means comprises a hook for engaging with a loop carried on the bottom of the container.

More specifically, the engagement means comprises a pair of laterally spaced-apart hooks for engaging with a respective pair of loops carried on the bottom of the container.

According to one preferred embodiment of the invention, the first support means comprises a plate adapted to be positioned under a wheeled container when the container is positioned on the supporting surface.

According to another preferred embodiment of the invention, the plate includes first and second telescoping elements, wherein the plate extends as the container is lifted upwardly through the second movement segment and retracts as the container is lowered downwardly through the second movement segment.

Preferably, the actuator means comprises a pressurized fluid piston and cylinder assembly.

According to one preferred embodiment of the invention, an apparatus provides for lifting and tipping a container off of a supporting surface in order to dump contents therefrom, the container being of the type having a bottom wall and upright side walls, the upper extent of which side walls define an opening. The apparatus includes first support plate means pivotally-mounted on the support surface for being positioned under and engaging the bottom of the container in a position substantially parallel to the supporting surface, and for supporting the bottom of the container through a range of lifting and tipping movement upwardly from the supporting surface and defining a first movement segment.

A second support plate means is pivotally-mounted on the plate for being positioned in a position substantially parallel to the supporting surface during the first movement segment and for pivoting upwardly and supporting the side walls of the container through a second range of lifting and tipping movement subsequent to the first lifting and tipping movement wherein the container is tipped to an angle sufficient to empty the contents therefrom. An actuator powers the movement of the first and second support plate means.

Preferably, the first movement segment includes movement of the side walls of the container into contact with the second support plate means with sufficient force to assist in dislodging the contents of the container therefrom.

According to one preferred embodiment of the invention, the first support plate means includes first and second telescoping elements, wherein the first telescoping element extends relative to the second telescoping elements as the container is lifted upwardly through the second movement segment and retracts relative to the second telescoping element as the container is lowered downwardly through the second movement segment.

According to yet another preferred embodiment of the invention, an apparatus is provided for lifting and tipping a container off of a supporting surface in order to dump contents therefrom, the container being of the type having a bottom wall and upright side walls, the upper extent of which side walls define an opening. The apparatus includes a base for being fixedly secured to the supporting surface and a first support plate pivotally mounted to the base for reciprocating pivotal movement relative thereto and for supporting the bottom of the container while lifting and tipping the container through a first range of movement. A second support plate is pivotally mounted by one end thereof to the base and by a spaced-apart second end thereof to the first support plate for reciprocating pivotal movement relative to the base and for simultaneous lifting and tipping movement in unison with the first support plate through a second range of movement to a position wherein the container is sufficiently inverted to empty contents therefrom.

A piston and cylinder assembly is mounted on the base and cooperating with the first support plate for effecting movement thereof. A stop is provided for arresting pivotal movement of the first support plate relative to the second support plate and initiating unison lifting and tipping movement of the first support plate relative to the second support plate.

Preferably, the invention includes positioning means for cooperating with a container having mating positioning means thereon for preventing operation of said apparatus except when said container is properly positioned on said first support plate means.

An embodiment of the method according to the invention comprises the steps of supporting the container by a bottom thereof, lifting and tipping the container through a first range of motion to a point where the bottom and a side wall of the container are both supported, lifting and tipping the container through a second range of motion while both the bottom and side wall of the container are supported to a point where the container is inverted to a degree sufficient to empty it and returning the emptied container to it starting position by repeating the lifting steps in reverse order.

According to one preferred embodiment of the invention according to the method, the first range of motion occurs around a first pivot point proximate the bottom of the container and the second range of motion occurs around a second pivot point proximate a top edge of the side walls.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Container

Figure 1:
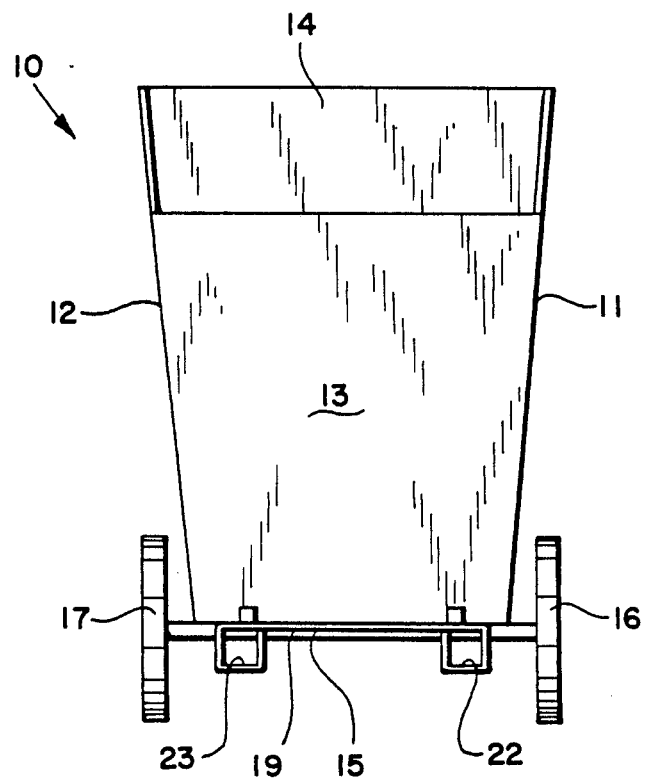
FIG. 1 is a front elevation view of a refuse container according to the present invention.
Figure 2:
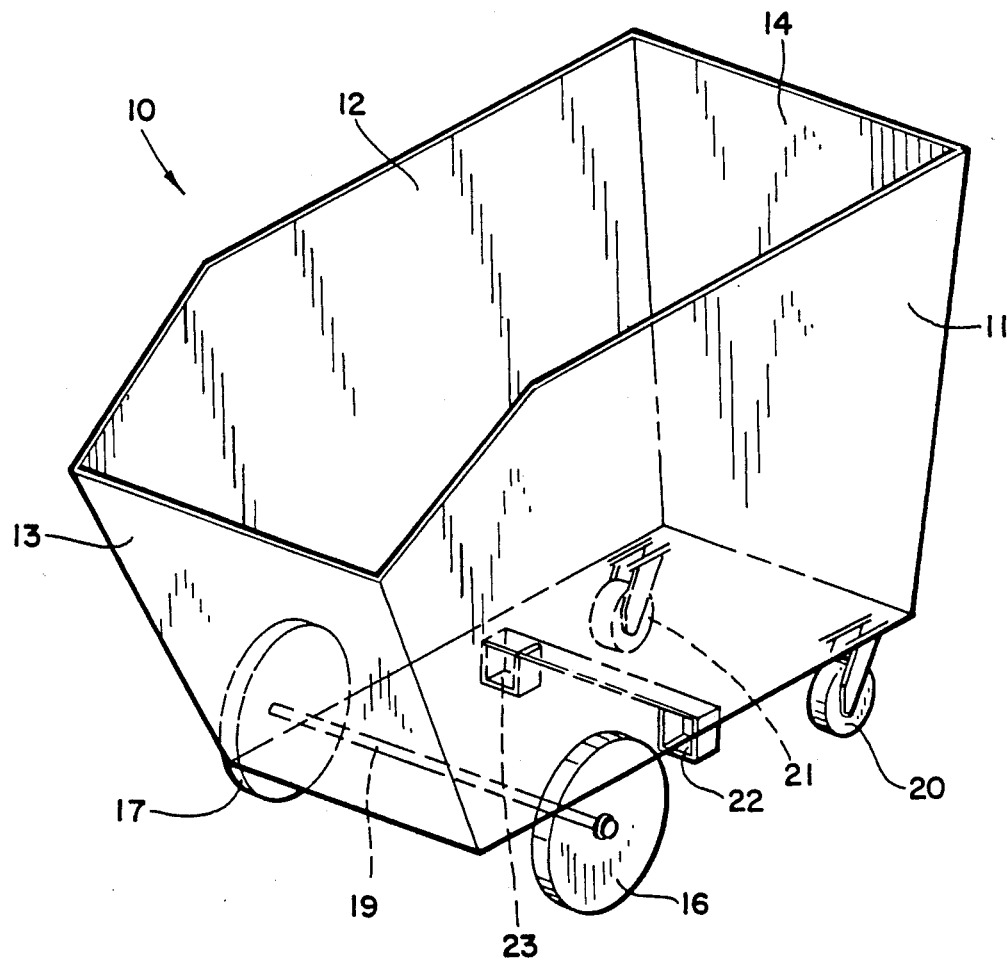
FIG. 2 is a perspective view of the refuse container shown in FIG. 1.

Referring now specifically to the drawings, a container for use with the present invention is illustrated in FIGS. 1 and 2 and shown generally at reference numeral 10. The container 10 has opposed side walls 11 and 12, and opposed forward and rear walls 13 and 14, respectively. Walls 11, 12, 13 and 14 diverge slightly in the direction upwardly from a bottom 15 to which the walls connect. Preferably, the container walls 11, 12, 13 and 14 are molded integrally with the bottom 15 and container 10 is fabricated of a highly durable and lightweight plastic such as medium to low density polyethylene. Front wall 13 is somewhat shorter than the other walls to permit emptying the container 10 at a lesser degree of tilt than would be the case if the forward wall 13 were the same height as the side walls 11, 12 and the rear wall 14.

A pair of wheels 16 and 17 are mounted on a common axle 19 onto the bottom of container 10 near its forward end by conventional brackets (not shown) and permit the container 10 to be easily rolled. Small caster wheels 20 and 21 are secured to the bottom of the container 10 adjacent the rear of the container and assist in rolling and steering.

A pair of engaging and positioning loops 22 and 23 are secured to the bottom of container in the approximate middle between wheels 16, 17 and caster wheels 20, 21. As is best shown in FIG. 1, loops 22, 23 are spaced apart a lesser distance than wheels 16, 17 so that access to loops 22, 23 can be had from the direction of the forward end of container 10 without interference from wheels 16, 17. Loops 22, 23 are formed by attaching relatively short lengths of substantially rectangular closed channel to bottom 15 in lateral spaced-apart relation. The opening of loops 22, 23 are directed along the orientation of the forward/rear axis of the container 10.

Emptying Apparatus

Figure 3:
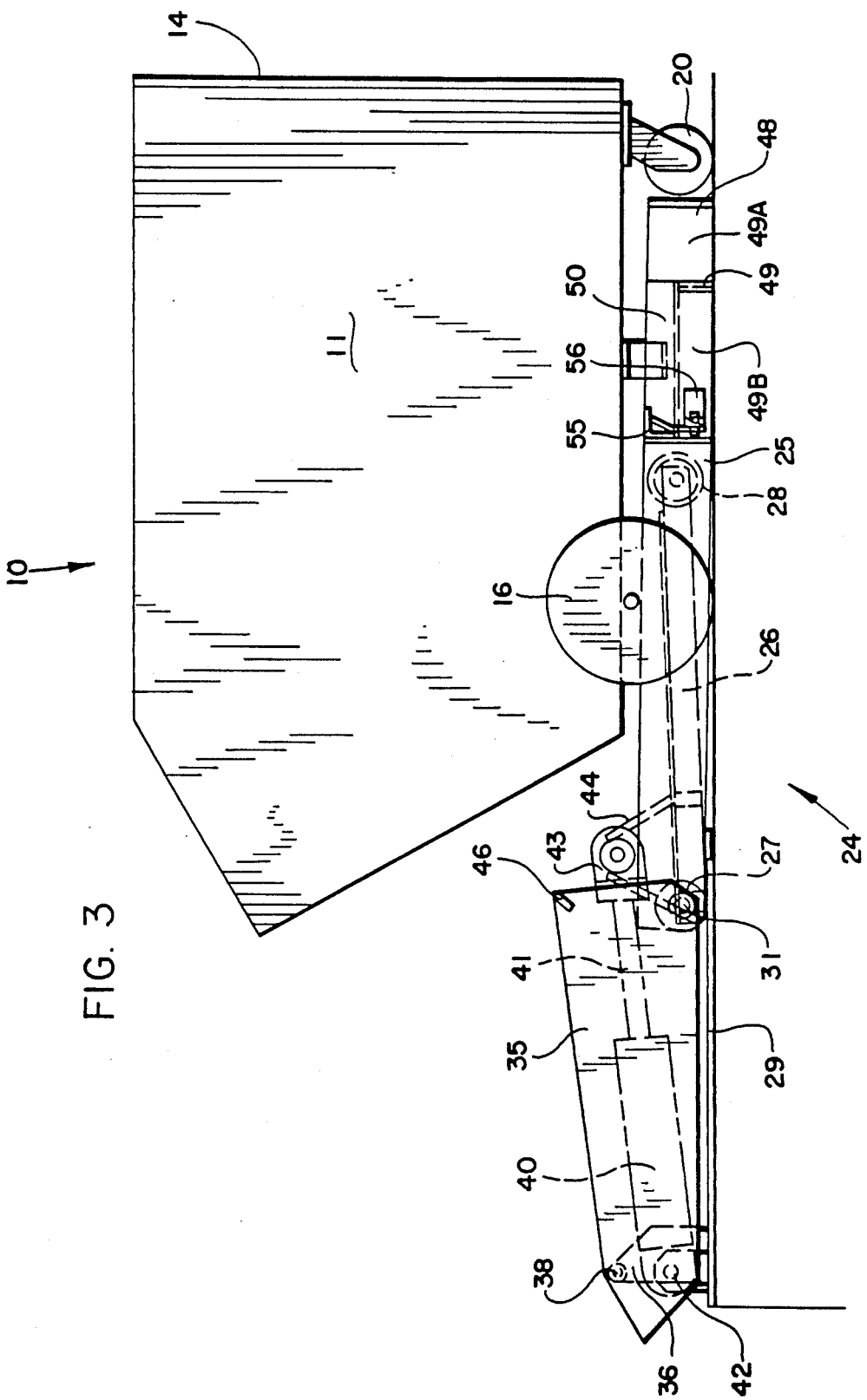
FIG. 3 is a side elevation view of the container emptying apparatus according to the invention with the container positioned therein in non-lifting position.

Referring now to FIG. 3, loops 22, 23 are positioned on container 10 and are vertically spaced to cooperate with a emptying apparatus 24 which lifts, tilts and empties container 10. Emptying apparatus 24 is typically mounted on a horizontal support surface such as a loading dock where the container 10 will be emptied into a truck, bin or trash compactor. Emptying apparatus 24 is constructed of a first support means comprising a lifting support plate 25 which, in the loading position, rests on the supporting surface. Lifting support plate 25 is mounted for telescoping movement on an actuator 26 by means of nylon rollers 27, 28.

Figure 9:
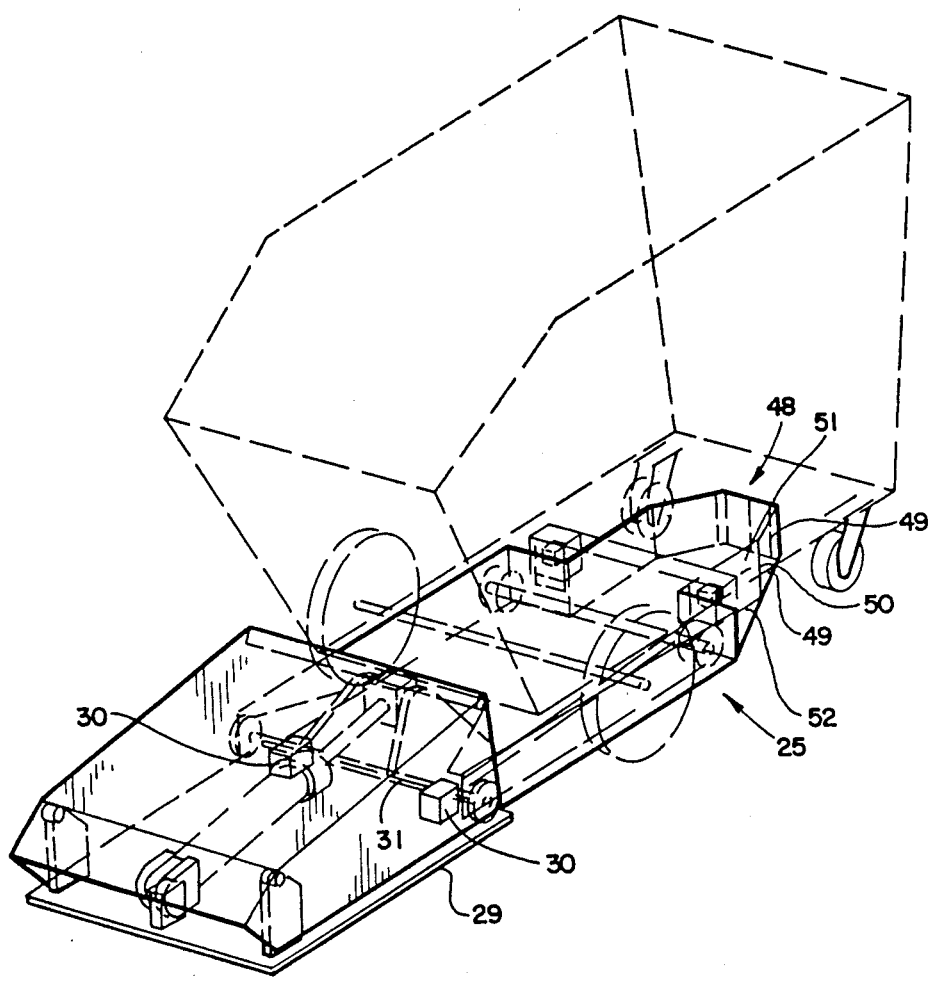
FIG. 9 is a perspective view of the emptying apparatus in position at the end of the first movement segment in order to show details of the support plates.
Figure 10:
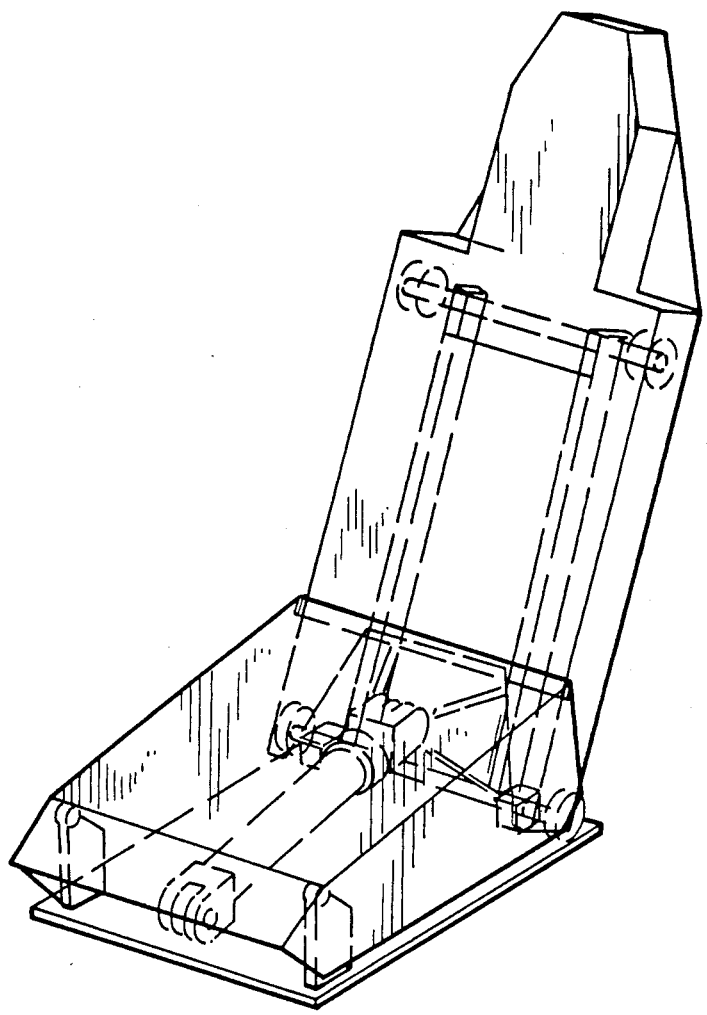
FIG. 10 is a perspective view of the container and emptying apparatus in position ready for lifting and emptying.

As is shown in FIG. 9, left and right hand components are the same, so that when applicable reference numerals refer to corresponding left and right-hand components as this description proceeds. Actuator 26 is pivotally-mounted on a mounting plate 29 by which emptying apparatus 24 is secured to the supporting surface. Blocks 30 secured to mounting plate 29 rotationally support a shaft 31 to which the end of actuator 26 adjacent roller 27 is mounted.

Referring again to FIG. 3, a second support means comprising a tipping support plate 35 is mounted on mounting plate 29. Mounting blocks 36 support a shaft 38 on which tipping support plate 35 is pivotally mounted. Tipping support plate 35 includes a hydraulic cylinder assembly comprising a cylinder 40 in which is mounted a piston (not shown) which moves a piston rod 41 into and out of cylinder 40. The blind side of cylinder 40 is pivotally mounted to mounting plate 29 by a mounting block 42. Piston rod 41 is pivotally mounted on a clevis 43 carried by a bracket 44. Bracket 44 is mounted on and pivots with actuator 26.

Tipping support plate 35 includes a stop bar 46 which extends laterally from one side to the other of tipping support plate 35 in the area above bracket 44.

Referring now to FIGS. 3 and 9, reference is made to the outer end of lifting support plate 25 which comprises a guide 48 having diverging side walls 4 which extend the full height of lifting support plate 25. A separator plate 50 defines an upper recess 51 and a lower recess 52.

Figure 4:
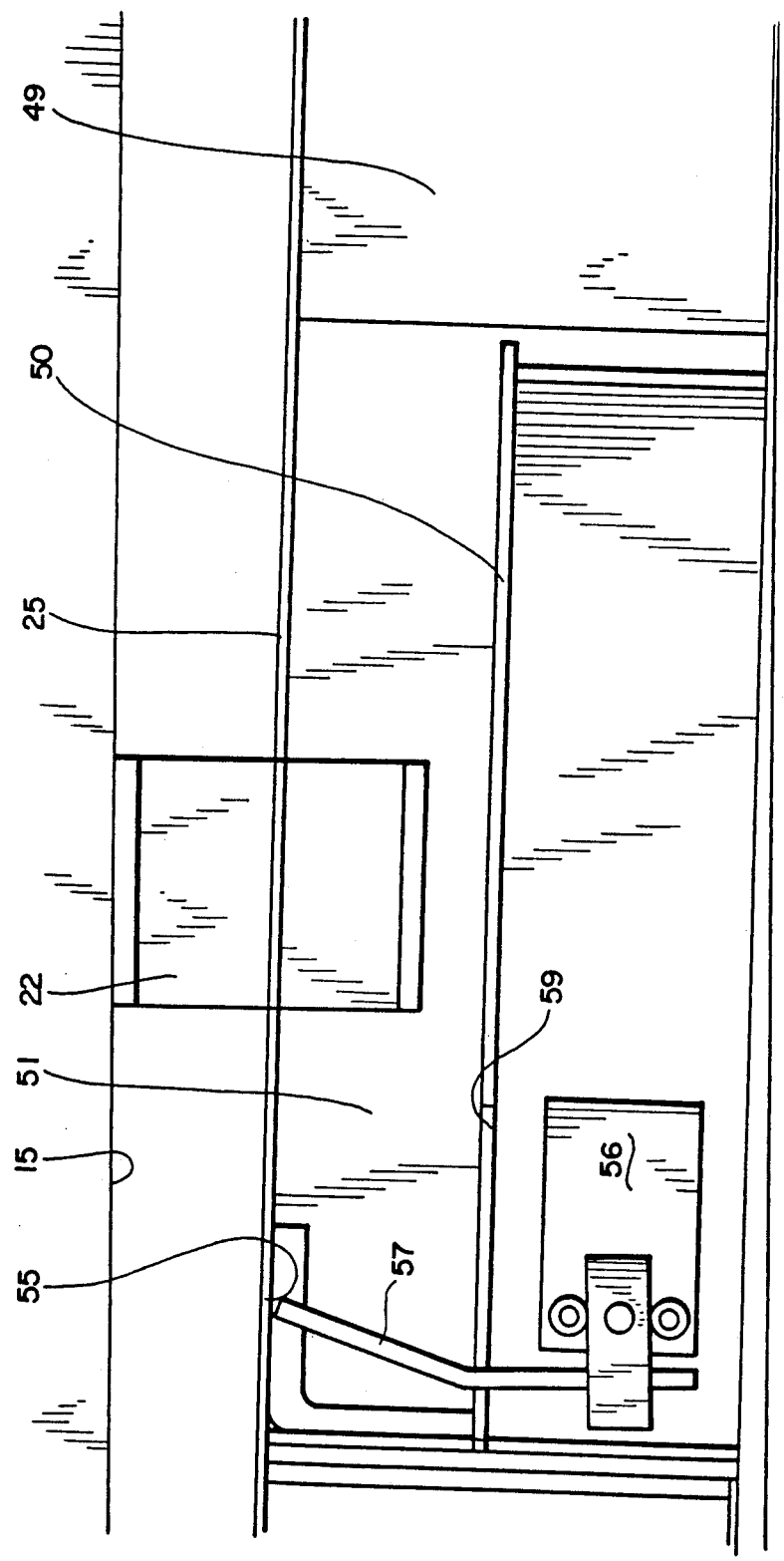
FIG. 4 is a enlarged, fragmentary view of the engaging and positioning parts of the container and emptying apparatus.

Emptying apparatus 24 includes means to permit lifting and tipping only when container 10 is properly mounted. Referring to FIG. 4, a rearwardly extending hooks 55 is mounted on lifting support plate 25 within upper recess 51. A ON/OFF switch 56 is mounted in lower recess 53 and includes a switch arm 57 which extends upwardly through an access opening 59 in separator plate 50 into upper recess 51 in a normally "OFF" position adjacent hook 55.

DESCRIPTION OF OPERATION OF EMPTYING APPARATUS

Figure 5:
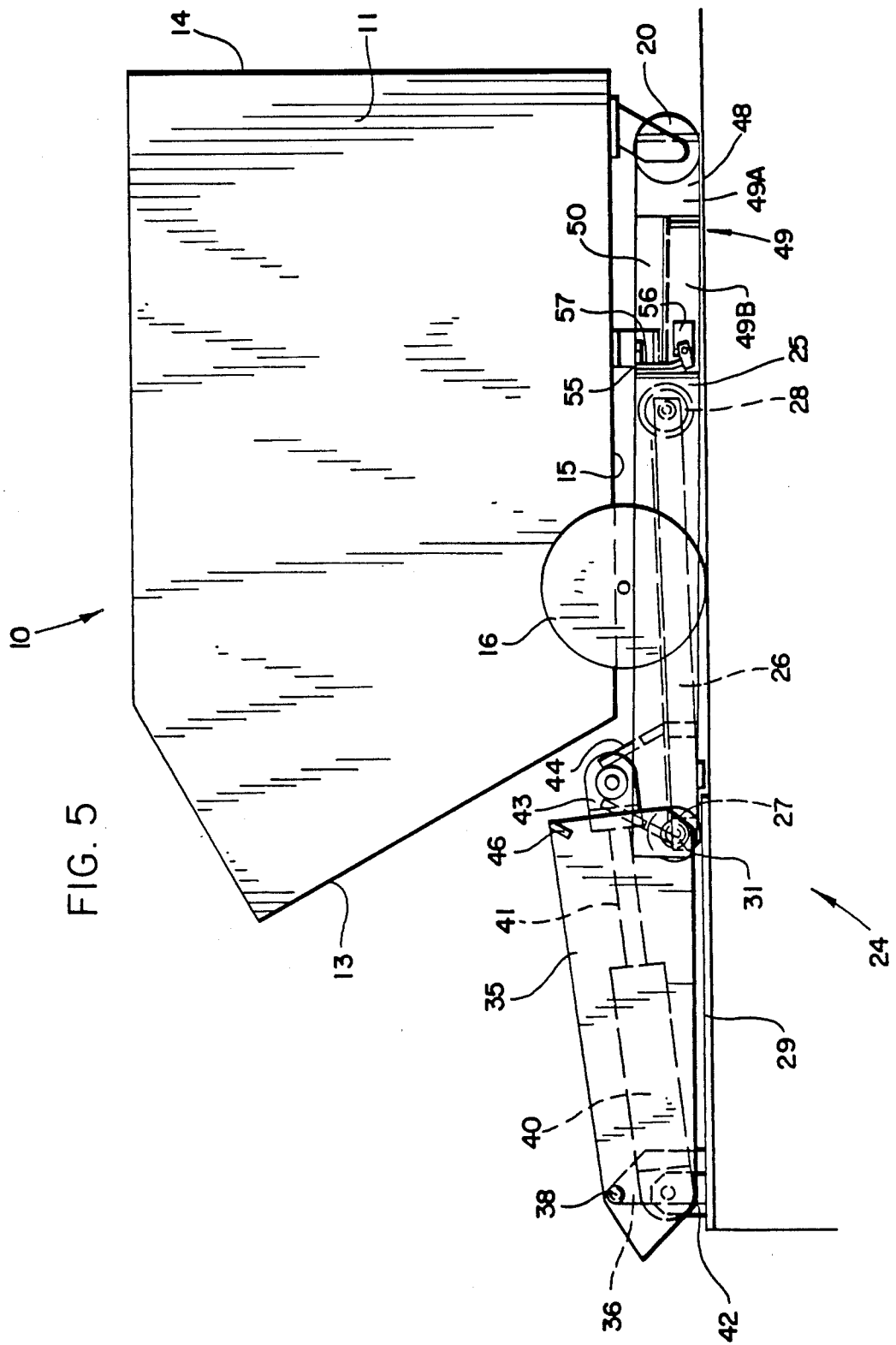
FIG. 5 is a view similar to FIG. 3 but showing the container in position for lifting.
Figure 6:
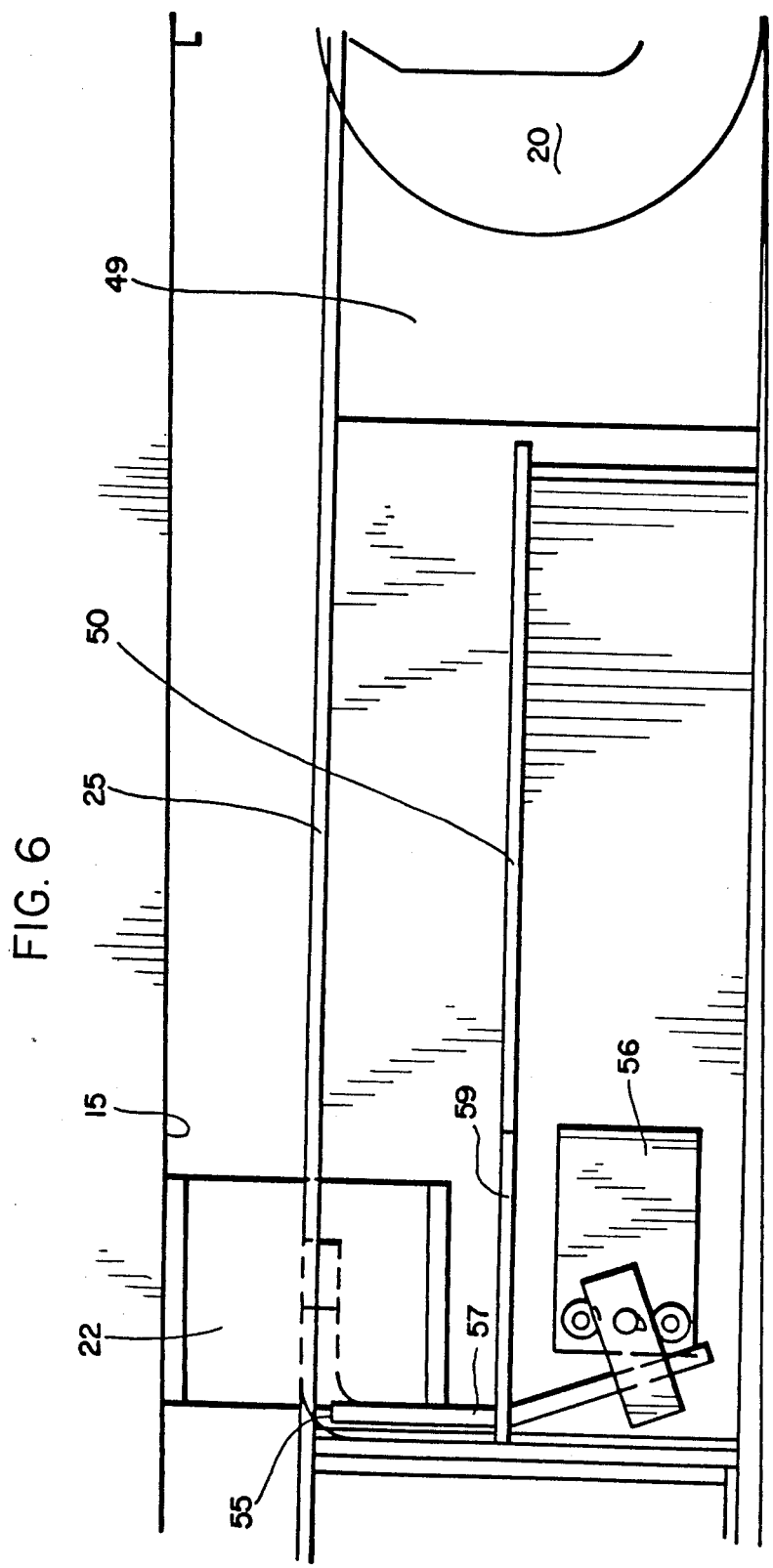
FIG. 6 is a view similar to FIG. 4 but showing the engaging and positioning parts of the container and emptying apparatus in position for lifting.

Container 10 is readied for emptying by pushing it onto lifting support plate 25. The diverging side walls 49 create proper lateral alignment between container 10 and lifting support plate 25 by diverting wheel 16 or 17 if one hits side wall 49 when being pushed onto the lifting support plate 25. In the position shown in FIGS. 3 and 4, the container is not yet ready to be lifted for emptying. It must be pushed forward another 15 to 2 cm., to the point where loops 22 and 23 of container 10 engage respective switch arms 57, as is shown in FIGS. 5 and 6.

Figure 7:
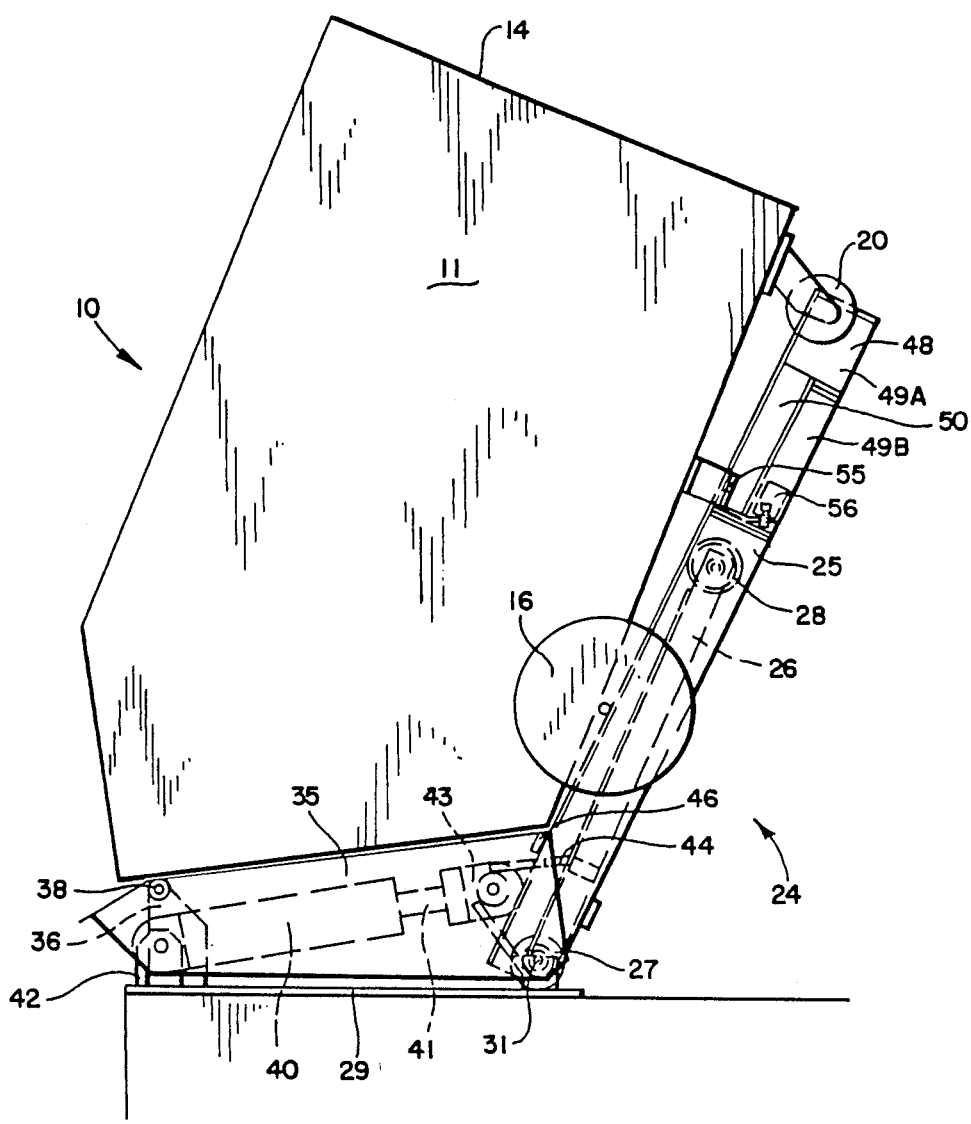
FIG. 7 is a side elevation view showing the position of the container and the emptying apparatus at the end of the first movement segment.

When depressed, switch arms 57 actuates switch 56. Piston rod 41 is drawn into cylinder 40, pulling with it bracket 44 mounted on lifting support plate 25. As is shown in FIG. 7, lifting support plate is levered upwardly, pivoting about shaft 31 of actuator 26 Pivoting about shaft 31 continues until the position shown in FIG. 7 is reached. During an early stage of this operation, container 10 falls forward slightly so that hooks 55 catch on the bottom of loops 22, 23. From this point on, container is essentially suspended by the hooks 55. This falling movement is rather sudden, and tends to cause the contents of the container 10 to dislodge and fall slightly forward, to assist in emptying.

Figure 8:
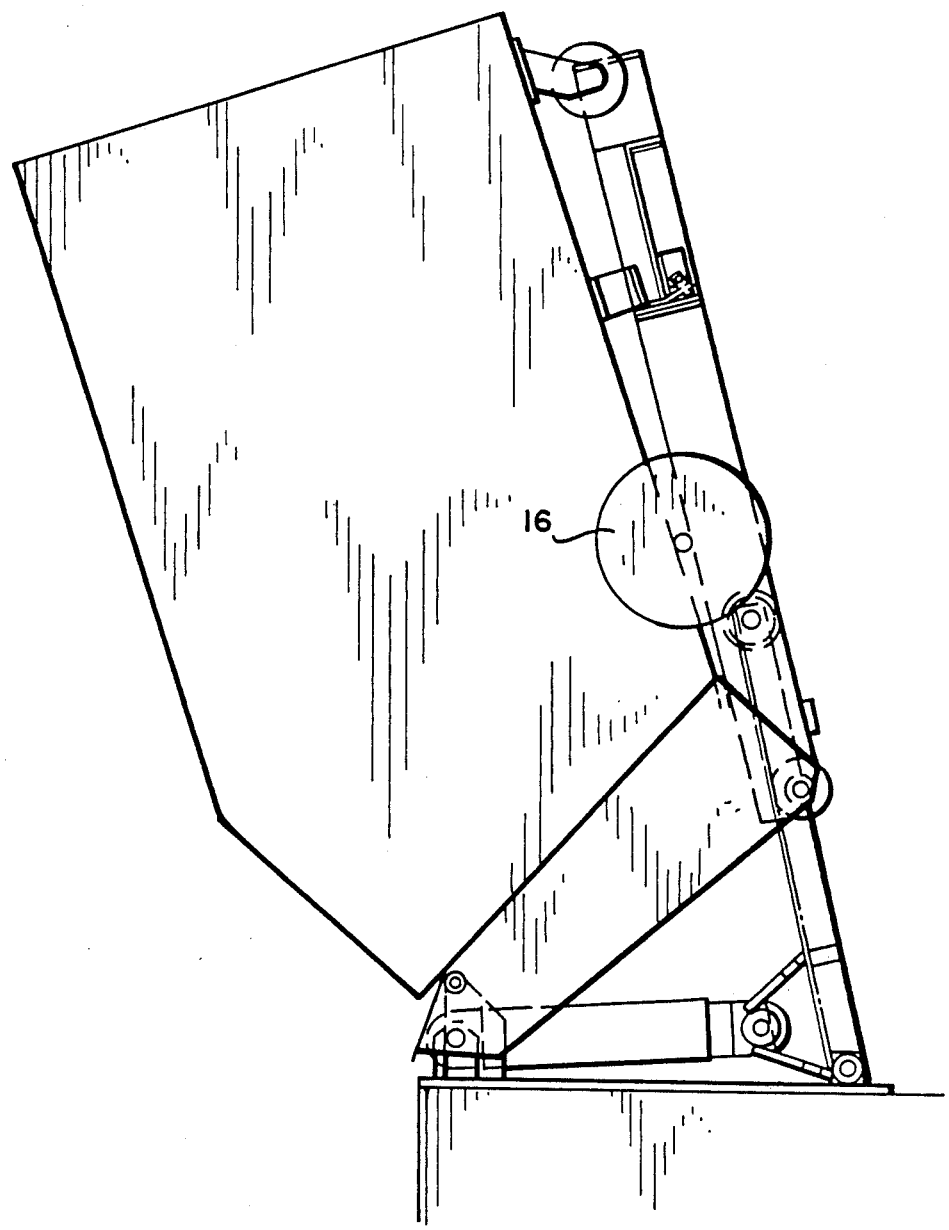
FIG. 8 is a side elevation view showing the position of the container and the emptying apparatus at the end of the second movement segment.

At this point the top surface of lifting support plate 25 engages stop bar 46 and is prevented from moving further. This engagement also causes a rather sudden stopping action which further tends to dislodge the contents of container 10, further enhancing the emptying process once the container is properly tipped for emptying. Up to this point, the forward wall 13 of container 10 has been unsupported. Just as lifting support plate 25 hits stop bar 46, forward wall 13 of container 10 is carried into the top surface of tipping support plate 35, as is also shown in FIG. 7, so that both the bottom 15 and forward wall 13 of container 10 are now supported. As forward wall 13 hits tipping support plate 35, container 10 is jarred somewhat, causing the contents to be dislodged and to move towards the forward end of the container 10. However, piston rod 41 is still being drawn into cylinder 40. Since lifting support plate 25 is prevented from further pivoting movement, the further pivoting movement of actuator 26 causes tipping support plate 35 to pivot about shaft 38 and, simultaneously, lifting support plate 25 to slide upwardly on nylon rollers 27 and 28 until the position shown in FIG. 8 is reached. At this point, container 10 is in its fully lifted and tipped position and the contents fall out of the top over forward wall 13. Note that the only mechanical means by which the container is held on emptying apparatus 24 is the engagement between loops 22, 23 and the respective hooks 55. By placing loops 22, 23 near the rear of container 10 and hooks 55 near the rear of lifting support plate 25, the center of gravity of the container is well forward of the loops 22, 23. The container 10 is therefore suspended without substantial stress on the bottom of container 10 as lifting and tipping takes place.

Alternately, the tipping support plate 35 may be eliminated or the container 10 may be positioned so that it does not actually contact tipping support plate 35. In this latter case, tipping support plate 35 acts as a structure which permits pivoting movement about shaft 38 but does not actually support the forward wall 13 of container 10. The container 10 is suspended from the hooks 55 and supported by the lifting support plate 25.

After emptying, the motion described above is reversed, and container 10 is lowered. When lifting support plate 25 is again resting on the support surface, container 10 can be pulled rearwardly off of emptying apparatus 24.

Preferably, switch 56 will not actuate emptying apparatus 24 unless an operator has depressed a remote switch after container 10 is properly positioned for lifting. Use of a normally "OFF" spring-loaded button permits emptying to take place only when the operator is at a station away from emptying apparatus 24. If the button is allowed to return to its normally "OFF" position, movement stops instantly. In addition, a "JOG" button can be provided to permit a series of back and forth movements at the top of the emptying cycle to dislodge any contents not earlier dislodged.

A container 10 of the type described above is rated to hold up to approximately 0.75 cubic meters of contents up to a gross weight of approximately 455 kg. A one-horsepower motor driving a 9 cm. cylinder has been found sufficient to lift a fully loaded container 10 with substantial reserves. Of course, the principles described above are applicable to various sizes and shapes of containers. For example, a cylindrical or frusto-conical container could be lifted by varying the length of the lifting support plate 25 and providing a tipping support plate 35 having a curved top surface generally corresponding to the curve of the container walls. An emptying apparatus is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:
1. An apparatus for lifting and tipping a container off of a supporting surface in order to dump contents therefrom, the container being of the type having a bottom wall and upright side walls, one of said side walls being a front wall the upper extent of which side walls define an opening, said apparatus comprising:
   (a) engagement means for engaging the bottom of the container;
   (b) first support means carrying said engagement means for supporting the bottom of said container through a first range of lifting and tipping movement upwardly from the supporting surface;
   (c) second support means cooperating with said first support means for contacting and supporting the forward side wall of said container through a second range of lifting and tipping movement subsequent to said first lifting and tipping movement;
   (d) actuator means operatively connected to said first and second support means for powering said first and second movement segments;
   whereby said first range of lifting and tipping movement is defined by a first movement segment wherein said forward side wall is not in contact with said second support means and whereby said second range of lifting and tipping movement is defined by a second movement segment wherein the container is tipped to an angle sufficient to empty the contents therefrom;
   wherein said first support means comprises a plate adapted to be positioned under said container when said container is positioned on the supporting surface; and
   wherein said plate includes first and second telescoping elements, wherein said plate extends as said container is lifted upwardly through said second movement segment and retracts as said container is lowered downwardly through said second movement segment.

2. An apparatus according to claim 1, wherein said first movement segment includes movement of said forward wall of said container into contact with said second support means with sufficient force to assist in dislodging the contents of the container therefrom.

3. An apparatus according to claim 1, wherein said container includes connection means attached to the bottom thereof and cooperating with said engagement means.

4. An apparatus according to claim 3, wherein said connection means includes switch means cooperating with said engagement means for activating said actuator means when said container is properly oriented in relation to said apparatus.

5. An apparatus according to claim 1, wherein said engagement means comprises a hook for engaging with a loop carried on the bottom of said container.

6. An apparatus according to claim 1, wherein said engagement means comprises a pair of laterally spaced-apart hooks for engaging with a respective pair of loops carried on the bottom of said container.

7. An apparatus according to claim 1, wherein said actuator means comprises a pressurized fluid piston and cylinder assembly.

8. An apparatus according to claim 1 and including positioning means for cooperating with a container having mating positioning means thereon for preventing operation of said apparatus except when said container is properly positioned on said first support means.

9. An apparatus for lifting and tipping a container off of a supporting surface in order to dump contents therefrom, the container being of the type having a bottom wall and upright side walls, one of said side walls being a front wall the upper extent of which side walls define an opening, said apparatus comprising:
   (a) first support plate means pivotally-mounted on said support surface for being positioned under and engaging the bottom of the container in a position substantially parallel to said supporting surface, and for supporting the bottom of said container through a first range of lifting and tipping movement upwardly from the supporting surface and defining a first movement segment;
   (b) a second support plate means pivotally-mounted on said first support plate means for being positioned in a position substantially parallel to said supporting surface during said first movement segment and for pivoting upwardly and for contacting and supporting the forward wall of said container through a second range of lifting and tipping movement subsequent to said first lifting and tipping movement wherein the container is tipped to an angle sufficient to empty the contents therefrom; and
   (c) an actuator for powering the movement of said first and second support plate means.

10. An apparatus according to claim 9, wherein said first movement segment includes movement of said forward wall of said container into contact with said second support plate means with sufficient force to assist in dislodging the contents of the container therefrom.

11. An apparatus according to claim 10, wherein said first support plate means includes a hook for engaging with a loop carried on the bottom of said container.

12. An apparatus according to claim 10, wherein said first support plate means comprises a pair of laterally spaced-apart hooks for engaging with a respective pair of loops carried on the bottom of said container.

13. An apparatus according to claim 10, wherein said first support plate means includes first and second telescoping elements, wherein said first telescoping element extends relative to said second telescoping elements as said container is lifted upwardly through said second movement segment and retracts relative to said second telescoping element as said container is lowered downwardly through said second movement segment.

14. An apparatus according to claim 10, wherein said actuator means comprises a pressurized fluid piston and cylinder assembly.

15. An apparatus according to claim 9, wherein said container includes connection means attached to the bottom thereof and cooperating with said first support plate means.

16. An apparatus according to claim 15, wherein said connection means includes switch means cooperating with said first support plate means for activating said actuator when said container is properly oriented in relation to said apparatus.

17. An apparatus according to claim 9 and including positioning means for cooperating with a container having mating positioning means thereon for preventing operation of said apparatus except when said container is properly positioned on said first support plate means.

18. An apparatus for lifting and tipping a container off of a supporting surface in order to dump contents therefrom, the container being of the type having a bottom wall and upright side walls, the upper extent of which side walls define an opening, said apparatus comprising:
   (a) a base for being fixedly secured to the supporting surface;
   (b) a first support plate pivotally mounted to said base for reciprocating pivotal movement relative thereto and for supporting the bottom of the container while lifting and tipping the container through a first range of movement;
   (c) a second support plate pivotally mounted by one end thereof to said base and by a spaced-apart second end thereof to said first support plate for reciprocating pivotal movement relative to said base and for simultaneous lifting and tipping movement in unison with said first support plate through a second range of movement to a position wherein said container is sufficiently inverted to empty contents therefrom;
   (d) a piston and cylinder assembly mounted on said base and cooperating with said first support plate for effecting movement thereof; and
   (e) a stop for arresting pivotal movement of said first support plate relative to said second support plate and initiating said unison lifting and tipping movement of said first support plate relative to said second support plate.

19. An apparatus for lifting and tipping a container off of a supporting surface in order to dump contents therefrom, the container being of the type having a bottom wall and upright side walls, one of said side walls being a front wall the upper extent of which side walls define an opening, said apparatus comprising:
   (a) engagement means for engaging the bottom of the container;
   (b) support means including a first plate means pivotally mounted to said supporting surface and including a second plate means pivotally mounted to said supporting surface and said first plate means;
   (c) wherein said support means carries said engagement means for supporting the bottom of said container through a range of lifting and tipping movement upwardly from the supporting surface to the end of said movement when said container is inverted sufficiently to empty the contents therefrom and defining a movement segment wherein said forward side wall of said container in relation to the direction of movement of said container is uncontacted by said support means; and
   (d) actuator means operatively connected to said support means for powering said movement.

20. An apparatus according to claim 19, wherein said container includes connection means attached to the bottom thereof and cooperating with said engagement means.

21. An apparatus according to claim 20, wherein said connection means includes switch means cooperating with said engagement means for activating said actuator means when said container is properly oriented in relation to said apparatus.

22. An apparatus according to claim 19, wherein said engagement means comprises a hook for engaging with a loop carried on the bottom of said container.

23. An apparatus according to claim 19, wherein said engagement means comprises a pair of laterally spaced-apart hooks for engaging with a respective pair of loops carried on the bottom of said container.

24. An apparatus according to claim 19, wherein said first plate means comprises a plate adapted to be positioned under said container when said container is positioned on the supporting surface.

25. An apparatus according to claim 24, wherein said plate includes first and second telescoping elements.

26. An apparatus according to claim 25, wherein said actuator means comprises a pressurized fluid piston and cylinder assembly.

* * * * *